United States Patent
Kaghazian (12)

(10) Patent No.: US 6,563,913 B1
(45) Date of Patent: May 13, 2003

(54) SELECTIVE SENDING OF PORTIONS OF ELECTRONIC CONTENT

(75) Inventor: Leila Kaghazian, Los Angeles, CA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 230 days.

(21) Appl. No.: 09/642,713

(22) Filed: Aug. 21, 2000

(51) Int. Cl.⁷ .............................................. H04M 11/00
(52) U.S. Cl. ................... 379/93.24; 379/88.17; 709/206
(58) Field of Search ................. 379/93.24, 88.13, 379/88.14, 88.16, 88.17, 93.17, 93.05, 93.06, 90.01; 370/352; 709/206

(56) References Cited

U.S. PATENT DOCUMENTS 6,192,396 B1 * 2/2001 Kohler ....................... 709/206

OTHER PUBLICATIONS

Grigsby et al.; System for capturing, annotating ... Internet Web Pages; Feb. 10, 2000; WO 00/07110.*

* cited by examiner

*Primary Examiner*—Melur Ramakrishnaiah
(74) *Attorney, Agent, or Firm*—Jeroen Heuvelman

(57) ABSTRACT

A user of a handheld communication device selects in a foreground process portions of an electronic document. In a background process a new document is prepared that comprises the selected portions. The user selects the address for forwarding the new document, and the new document gets sent in a background process.

12 Claims, 3 Drawing Sheets

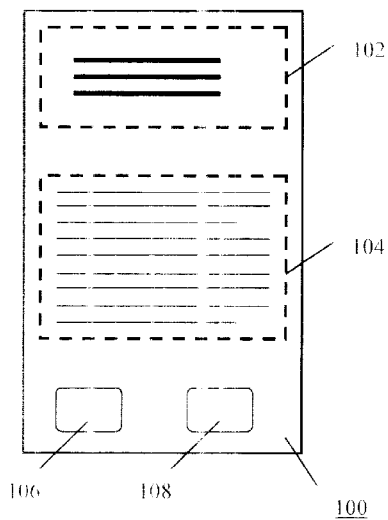
Fig.1
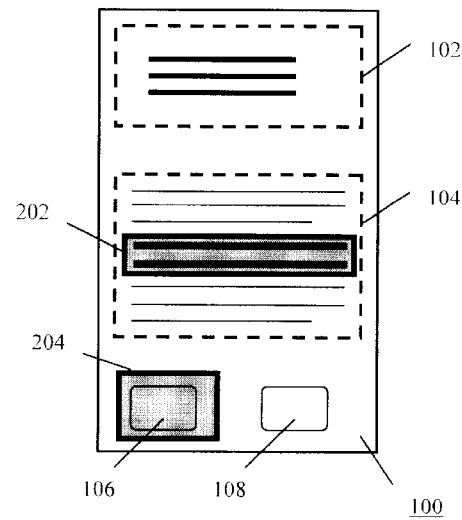
Fig.2
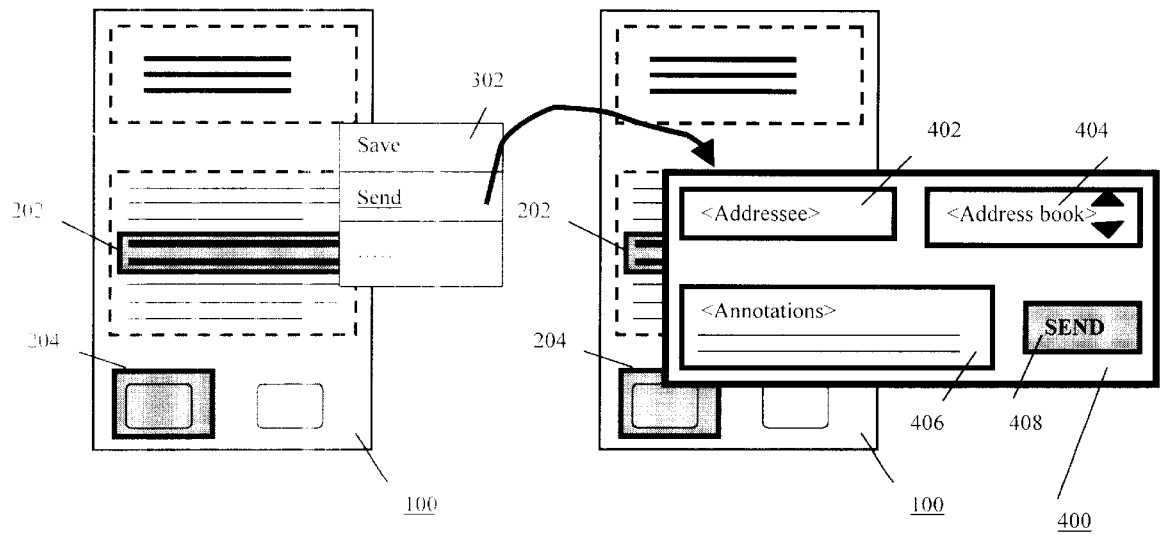
Fig.3
Fig.4

SELECTIVE SENDING OF PORTIONS OF ELECTRONIC CONTENT

FIELD OF THE INVENTION

The invention relates to processing of electronic content information, and specifically to sending an email with portions of content information selected from a previous email or from another electronic document such as a Web page.

BACKGROUND ART

As an example of electronic documents, consider an email system. Email enables users to exchange computer messages via a data network such as the public Internet and the private AOL. The email protocol is a component of the Transport Control Protocol/Internet Protocol (TCP/IP). All online services and Internet Service Providers (ISPs) offer email, and most of them also support gateways for exchanging mail with users of other systems. Email messages typically comprise text, and can have text, graphics, video, sound files, web pages, etc., as attachments to or embedded within the email body.

As another example of electronic documents, consider Web pages. A browser enables the user to access the information available on the World Wide Web. Typically, this information comprises HTML codes that via the browser control how the information, i.e., the Web page, is being displayed for the user.

SUMMARY OF THE INVENTION

The inventor addresses the user-friendliness of handling electronic documents, especially on handheld devices. For example, emails received may need to be stored, or forwarded to another person, but only portions thereof are considered relevant or interesting enough to be stored or forwarded. As another example, web pages are frequently downloaded and stored locally at the user's PC for reading later on. The user may want to annotate the page before storage, or store only certain portions or forward the page to another person with annotations or indications.

To this end, the invention provides a software application for enabling a user to operate on an electronic document, e.g., an email received or a Web page. The application enables the user in a foreground process to select a portion of information content of the document. The application prepares in a background process a new electronic document, e.g., a new email or an HTML document, based on the selected portion, and enables the user in a foreground process to specify a processing of the new document, e.g., forwarding in an email, storing locally, etc. The application then processes the new document in a background process as specified by the user.

For example, the electronic document on which the user wants to operate comprises a Web page. The user identifies graphically the interesting portions of this document, e.g., through a highlighting feature. The new electronic document generated in the background comprises a copy of this Web page with the selected portion or portions identified through highlighting. The user may then specify to sending the Web page with the highlighted portions in an email message. The selected portion is distinguished in the Web page when rendered upon receipt of the email message by the addressee. Preferably, the user is enabled to add an annotation to the selected portion. The annotation is rendered at the addressee's receiver when a pointer is positioned over the selected portion in the rendered Web page.

As to using the invention within an email context, partial transferring of an email is relevant on mobile phones or palmtop PCs with email capabilities. The invention enables creating and sending a pruned email, in a background process, without forwarding the entire original email.

As to partially forwarding or storing an image, image editor software lets the user select a portion of the image and have the portion stored or sent following a similar processe as sending part of a text as mentioned above. In order to send that portion of a given image the email system opens a new email in a background process, saves the specified portion of the image in a temp file (which is similar to changing an attachment in known commercial email systems), and attaches the file to a new email and sends it to the addressee.

With regard to Web pages, currently available email systems within browsers give the users the option to send either the URL of a site or the whole page as an attachment. In the invention, the email program enables the user to select a portion of the rendered web page, e.g., through highlighting, and the highlighted part gets added to the email. Alternatively, the pointer coordinates of the start and finish of the highlighted portion, typically a rectangle, get added to the email to be sent, together with the URL of the Web page. In the receiver email system, the email opens with retrieving the Web Page, as indicated by the URL, from the Internet and re-creates the highlighting based on the pointer coordinates sent along.

Preferably, the user is enabled to add an annotation to the Web page as stored or forwarded with the selected portions. For example, a software module is provided that comprises an authoring tool with a functionality similar to the one for creating "help" labels in PC applications. A "help" label in the form of a small cream rectangle, pops up on the screen when the user positions the pointer over an annotated item. In a Netscape browser, for example, positioning the pointer within the area of certain icons and images in an HTML document triggers the appearance of these cream rectangles with texts. Positioning the pointer over the "Reload" icon causes a rectangle to appear with the text "reload this page from the server". Positioning the pointer over an image in a CNN web page causes the text to appear that briefly describes the associated image in keywords. This authoring tool can be merged with, or linked to, the software application in the invention for storing and forwarding annotated HTML files.

With regard to sound files, it is also possible to add a simple feature to the current play-out software to enable the user to select a portion of a sound file. For example, the progress of the play-out of a file is typically represented graphically by a colored bar that gets longer with the play-out time. Alternatively, a-clock-like counter indicates numerically the moment in time associated with the currently played out sound data, e.g., since the playing out of the file from its begin. Selecting begin and end positions of the portion the user intends to send in an email can be achieved graphically by choosing two positions on the progress bar, or by selecting the associated moments of play-out time. These pointers determine the part of the file to be attached to the email to be sent.

Accordingly, the inventor proposes to enhance email programs and browsers with a functionality to label or tag portions of an electronic document, e.g., by highlighting for automatically having, the labeled or tagged portions further processed, e.g., stored or forwarded. The selective forwarding or storage requires only a few user-interactions and the processing takes place largely as a background process. The invention is particularly of interest to mobile communication devices such as mobile phones or PDA's with wireless modems. These devices have necessarily small screen real estate that preferably is being used efficiently for information exchange. Selecting relevant portions of a text in an authoring mode of such device or receiving a text reduced to only what is relevant increases user-friendliness of these devices.

Note that the invention is especially useful in email chats that typically comprise long strings of messages in response upon response.

With respect to a handheld with a wireless modem, see, e.g., U.S. Ser. No. 09/427,821 filed Oct. 27, 1999 for Joost Kemink and Rik Sagar for PDA HAS WIRELESS MODEM FOR REMOTE CONTROL VIA THE INTERNET. This document relates to a handheld data processing device, e.g., a PDA, (Personal Digital Assistant) with a user-interface and a wireless modem coupled to the handheld. The wireless modem enables communication with a server via a data network such as the Internet. A control network is coupled between the server and controllable equipment. The handheld is now capable of functioning as a wireless remote control device for the equipment via the Internet and the server. The system may comprise a video camera together with hardware and software to create a formatted still image suitable for being displayed on the handheld device. The user can now instruct retrieval of a still image from the server via the Internet. This application serves as, e.g., a security system that enables the remote user to monitor his/her front porch, or to monitor a child by way of a remote (or fall-back) baby-sit. The user-accessibility of equipment is guaranteed by the ubiquity of the Internet, thus enabling to expand the range of control and monitoring capabilities for a mobile user.

BRIEF DESCRIPTION OF THE DRAWING

The invention is explained in further detail, by way of example and with reference to the accompanying drawing, wherein:

FIGS. 1–7 are diagrams illustrating the invention within the context of forwarding or storing an email and/or a Web page.

Throughout the drawing, same reference numerals indicate similar or corresponding features.

DETAILED EMBODIMENTS

Figure 5:
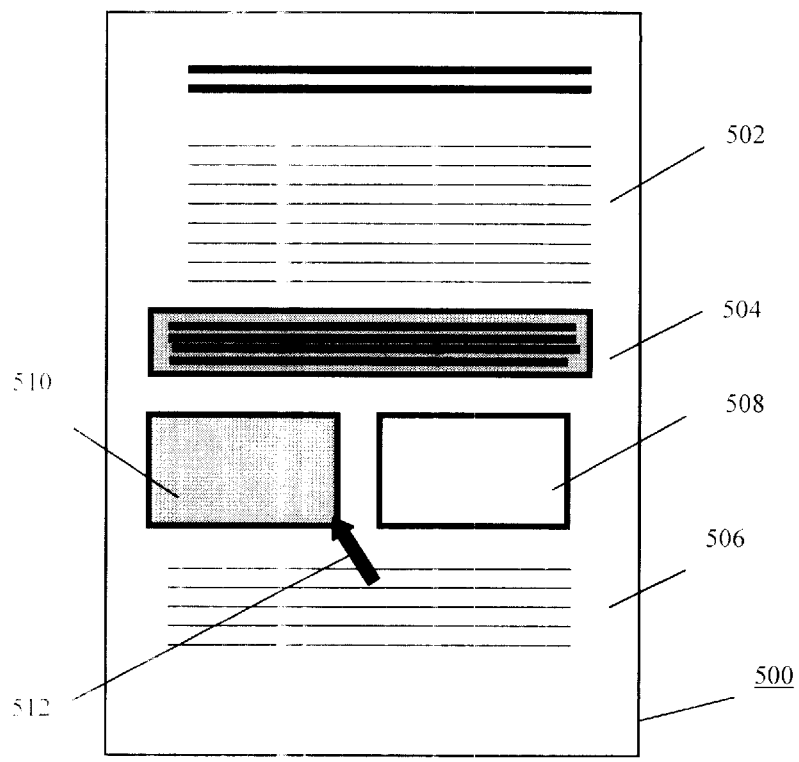

FIG. 1 is a diagram of the graphical representation of an email document 100 on a display of, e.g., a laptop or of a mobile communication device. Document 100 comprises a header 102, a text body 104 and attachments 106 and 108. Header 102 typically indicates who the sender is, what the subject is and what time the email got sent, etc. Text body 104 comprises text in alphanumerical characters, and attachments 106 and 108 are graphical representations of the files attached to email 100 when received by the current user.

FIG. 2 is a diagram of email 100, wherein are graphically indicated portions 202 and 204 that the user believes are relevant to another person to whom he/she would like to forward that information but without the rest. Portion 202 is a part of text body 104, and portion 204 is attachment 204 in this example. The user has selected portions 202 and 204, e.g., through highlighting similarly to the highlighting tool of a word processing program or in a browser. This is done in a foreground process per portion by positioning a cursor, left-clicking a mouse button and dragging the cursor to a new position. Any content in a rectangle between the two positions gets highlighted. Alternatively, the user chooses a highlighting software tool that highlights portions of a text or of another item when rendered on a display monitor. In software terms, the portions get tagged. Tagging itself is known from, e.g., word processing applications, wherein the control codes for rendering of the text can get displayed (e.g., in "WordPerfect") or from HTML and XML software tools.

FIG. 3 is a diagram illustrates a menu 302 that pops up when the user right-clicks on the mouse. Menu 302 has an option "Send", an option "Save", and possibly other options. It is known from browser technology, e.g., Netscape, that right-clicking the mouse lets appear a menu while the cursor is positioned[]within the browser window. The menu has an option "send" which, when selected, automatically opens up a new window for an email application. The text body in the email window of the known browser automatically includes the URL of the web page currently being displayed in the browser window. In the invention, however, a new document is created in a background process under the "Send" option of menu 302. The tagging controls the copying of the tagged portions into the new document.

FIG. 4 is a diagram of a window 400 that is created in the foreground as a result of the user choosing the "Send" option of menu 302. Window 400 has itself interactive items 402, 404, and 406. Item 402 is a window wherein the user can entering a name or address of the intended addressee. Item 404 is a window for scrolling up or down in an addressee book for selecting a preprogrammed name or address. Item 406 is a window wherein the user can add annotations through a keyboard of the laptop or a virtual keyboard accommodated on the mobile device. When the user has selected the addressee and added the annotations (if any), the user clicks a "SEND" button 408. This combines the annotations in window 406 with selected portions 202 and 204 in the background document and sends the thus created document.

FIG. 5 is a diagram of a Web page 500 with certain parts that the user would like to store or forward in an email. Web page 500 is typically an HTML file. Page 500, when rendered, comprises text sections 502, 504, and 506, and images 508 and 510. The user selects text portion 504 and image 510, e.g., through highlighting by positioning a pointer 512 in the corners determining a rectangle that comprises the relevant portion. Three corners determine the rectangle unambiguously. The highlighting can be represented in XML tags for example. Upon a user's right-click, an email is prepared in a background process that enables the receiver to retrieve the highlighted portions as attachments. Alternatively, the receiver gets the email with the URL of page 500 together with control information that control the browser to highlight or otherwise graphically identify portions 504 and 510 when the receiver downloads page 500 from the Internet. When XML codes are being used, the receiver preferably has a corresponding XSL style sheet to properly enable the processing of the tags.

Figure 6:
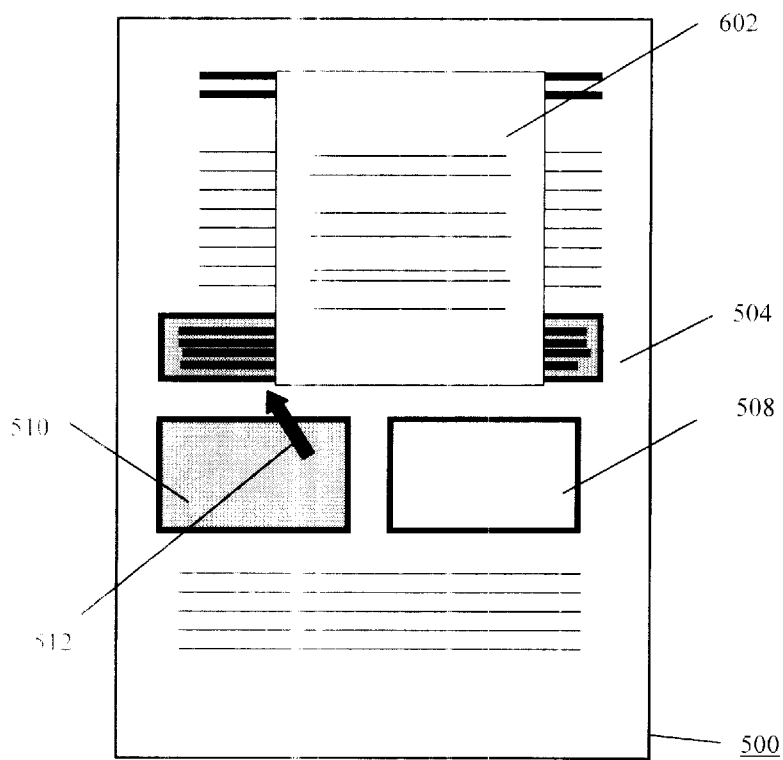

FIG. 6 illustrates the case when the sender may want to communicate or store annotations to portions 504 and 510 along with page 500. The software on the user's PC or communication device comprises an authoring tool to create annotation 602 that are rendered when pointer 512 is positioned within the screen area of, in this example, portion 510 of the processed Web page. Annotation 602 is created in a way similar to creating the "help" boxes in known software applications or browsers that appear as cream boxes when the pointer is positioned over the associated icon or image. In the known applications, this annotating is done by professionals using a professional authoring tool. In the invention, this tool is made available to the consumer for the purpose discussed above. Note that on a handheld, the annotation may occupy a substantive portion of the screen real estate.

Figure 7:
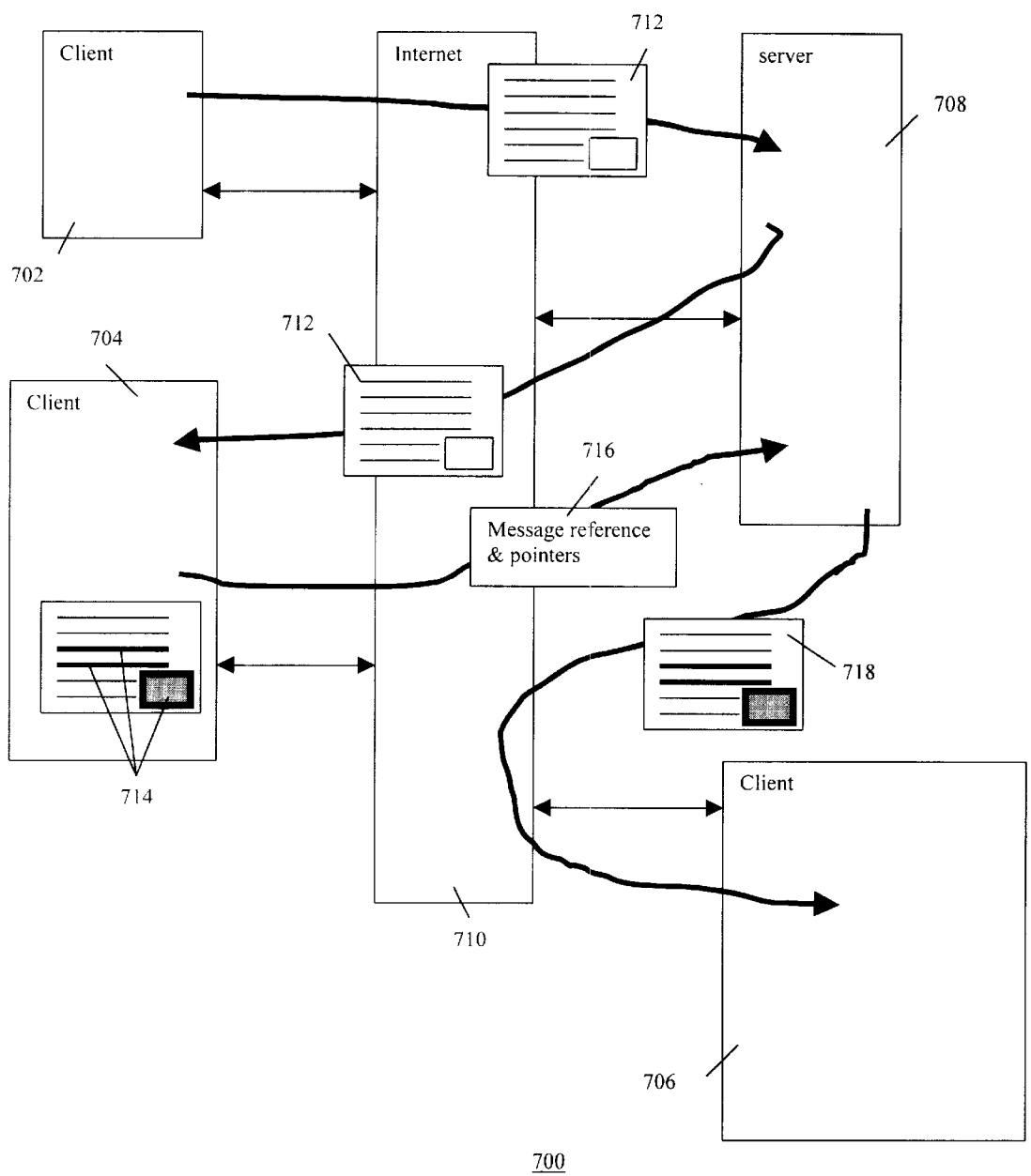

FIG. 7 illustrates another implementation of the invention in the form of a distributed system 700. System 700 comprises clients 702, 704 and 706 that are coupled to a server 708 via the Internet 710 or an intranet. Client 702 sends an electronic document 712 to client 704 via server 708. Server 708 keeps a local copy of document 712, at least temporarily. The user of client 704 wants to forward document 712 to client 706 with annotations or highlighted portions 714. The user of client 704 selects portions 714 as explained above. The background process at client 704 collects pointers 716 for highlighted portions 714 and sends pointers 716 to server 708, together with a reference to identify document 712 at server 708. At server 708, pointers 716 get combined with the copy of electronic document 712 to create a new electronic document 718, e.g., a partially highlighted or annotated Web page. Server 708 then sends new document 718 to client 706. An advantage of this distributed system is the reduction in traffic, since only pointers 716 get sent from client 704 to server 708, instead of the entire annotated document. A similar scenario is feasible regarding pruned email messages using the invention as described above.

For an example of a convenient virtual keyboard as mentioned above, see US. Ser. No. 09/062,364/ filed Apr. 17, 1998 for Jan van Ee and Sung Choi for GRAPHICAL USER INTERFACE TOUCH SCREEN WITH AUTO ZOOM FEATURE, herein incorporated by reference. This document relates to a soft-keyboard implemented on a touch screen, especially for a mobile device whose display has limited screen real estate. The keyboard as displayed is too small for the user to activate individual ones of the alphanumerical keys. When the user touches the screen in the region where the desired key resides, that region gets magnified so that the user can select the desired key in an easy manner. Surprisingly fast text entry is possible through this so-called "auto-zoom" keyboard.

As an alternative implementations of a virtual keyboard, see U.S. Ser. No. 09/251,682 filed Feb. 17, 1999 for Scott Vance et al., for MULTIPLE PRESSURE SENSORS PER FINGER OF GLOVE FOR VIRTUAL FULL TYPING, herein incorporated by reference. This document relates to a glove that has an array of pressure sensors mounted longitudinally at the finger-tips. When touching a rigid surface with the glove, different sensors are being activated dependent on the orientation of the finger tip relative to the surface. This configuration enables implementing a virtual keyboard having multiple rows of keys.

For interacting with graphical information on a relatively small display, see U.S. Ser. No. 09/619,426 filed Jul. 19, 2000 for Jan van Ee for HAND-HELD WITH AUTO-ZOOM FOR GRAPHICAL DISPLAY OF WEB PAGE. This document relates to a mobile phone that has a display with a touch screen. The device has a browser and is capable of retrieving a Web page from the Internet. The page is first displayed in its entirety. The user can recognize the page's general lay-out and presence of hyperlinks. When the user touches a particular location on the touch screen that corresponds to a portion of the page's image, the portion gets displayed so as to fill the display's area. Thus, the user can browse the Web with a display of limited size.

What is claimed is:

1. A software application for enabling a user to operate on an electronic document, wherein:

the application enables the user in a foreground process to select a portion of information content of the document;

the application prepares in a background process a new electronic document based on the selected portion, including collecting pointers associated with the selected portion and a reference to the document;

the application enables the user in a foreground process to specify a processing of the new document; and the application processes the new document in a background process as specified by the user.

2. The application of claim 1, wherein:

the document comprises an email message;

the new document comprises a new email message; and the processing comprises sending the new email message.

3. The application of claim 2, wherein the user has an option of adding an annotation to the new email message before the sending.

4. The application of claim 1, wherein:

the electronic document comprises a Web page; and the new electronic document comprises a file with an identification of the selected portion.

5. The application of claim 4, wherein the processing comprises sending an email message that enables a receiver to perceive the Web page wherein the selected portion is distinguished.

6. The application of claim 4, wherein:

the application enables the user to add an annotation to the new document; and the annotation gets rendered when a pointer is positioned within a predetermined area of the Web page when rendered under control of the file.

7. A data processing device comprising a software application for enabling a user to operate on an electronic document, wherein:

the application enables the user in a foreground process to select a portion of information content of the document;

the application prepares in a background process a new electronic document based on the selected portion, including collecting pointers associated with the selected portion and a reference to the document;

the application enables the user in a foreground process to specify a processing of the new document; and the application processes the new document in a background process as specified by the user.

8. The device of claim 7, wherein:

the document comprises an email message;

the new document comprises a new email message; and the processing comprises sending the new email message.

9. The device of claim 8, wherein the user has an option of adding an annotation to the new email message before the sending.

10. The device of claim 7, comprising a browser, and wherein:

the electronic document comprises a Web page; and the new electronic document comprises a file with an identification of the selected portion.

11. The device of claim 10, wherein the processing comprises sending an email message that enables a receiver to perceive the Web page wherein the selected portion is distinguished.

12. The device of claim 10, wherein:

the application enables the user to add an annotation to the new document; and the annotation gets rendered when a pointer is positioned within a predetermined area of the Web page when rendered under control of the file.

\* \* \* \* \*